United States Patent [19]

Sim et al.

[11] Patent Number: 5,772,222
[45] Date of Patent: Jun. 30, 1998

[54] CONVERTIBLE VEHICLE

[76] Inventors: Richard J. Sim, 841 12th Ave., Prospect Park, Pa. 19076; George T. Zuzulock, Jr., 406 Lakehurst Ave., National Park, N.J. 08063

[21] Appl. No.: 517,644

[22] Filed: Aug. 22, 1995

[51] Int. Cl.$^6$ ...................................................... B62B 3/02
[52] U.S. Cl. ...................... 280/30; 280/87.01; 280/47.34
[58] Field of Search .................................. 280/30, 87.01, 280/39, 40, 42, 651, 656, 47.34

[56] References Cited

U.S. PATENT DOCUMENTS

| | | |
|---|---|---|
| 166,903 | 8/1875 | Staub . |
| 1,261,610 | 4/1918 | Platter . |
| 1,560,288 | 11/1925 | Murvay . |
| 2,134,904 | 11/1938 | Bacon, Jr. . |
| 2,436,643 | 2/1948 | Hafner . |
| 2,542,433 | 2/1951 | Rockman ............................ 280/87.01 |
| 2,603,500 | 7/1952 | Messier . |
| 2,604,333 | 7/1952 | Elmer . |
| 2,967,058 | 1/1961 | Hoffmann, Jr. . |
| 3,035,847 | 5/1962 | Born . |
| 3,116,935 | 1/1964 | Mitchin et al. . |
| 3,677,571 | 7/1972 | Maturo, Jr. et al. . |
| 3,826,511 | 7/1974 | Frank . |
| 3,940,175 | 2/1976 | Robison . |
| 4,114,914 | 9/1978 | Cohen . |
| 4,300,783 | 11/1981 | Fisher . |
| 4,316,615 | 2/1982 | Willette . |
| 4,376,547 | 3/1983 | Dominko . |
| 4,460,188 | 7/1984 | Maloof . |
| 4,570,961 | 2/1986 | Chateauneuf et al. . |
| 4,706,817 | 11/1987 | Greathouse . |
| 4,796,909 | 1/1989 | Kirkendall . |
| 4,846,493 | 7/1989 | Mason . |
| 5,230,523 | 7/1993 | Wilhelm .................................. 280/30 |
| 5,306,029 | 4/1994 | Kaiser, II . |
| 5,407,218 | 4/1995 | Jackson .................................. 280/30 |
| 5,480,170 | 1/1996 | Kaiser, II .............................. 280/30 |
| 5,524,915 | 6/1996 | Liu ........................................ 280/30 |
| 5,529,323 | 6/1996 | Vom Braucke et al. ........... 280/87.01 |

*Primary Examiner*—Brian L. Johnson
*Assistant Examiner*—Avraham Lerner
*Attorney, Agent, or Firm*—Lipton, Weinberger & Husick; Robert S. Lipton, Esq.

[57] ABSTRACT

An apparatus which is convertible between a multi-wheeled vehicle and a multi-legged stationary structure such as a table, crib or playpen. The invention is comprised of a main body to which are attached wheel assemblies capable of freely pivoting movement under the force of their own weight when the body is lifted. Wide tires are provided which, after swiveling downward, will result in supporting the body. The wheel thickness is enough so that the vehicle rolls well in soft or sandy soils, while contributing to the resulting height of the raised body, after the vehicle is lifted and the wheel assemblies have pivoted down into their vertical position.

18 Claims, 13 Drawing Sheets

CONVERTIBLE VEHICLE

BACKGROUND OF THE INVENTION

The invention relates to apparatus for transporting articles, and more particularly, to a vehicle possessing the capability of conversion into a table, playpen and the like. Excursions to beaches and recreational areas often require the transportation of various necessities to the selected location. The transportation of larger items such as a table, crib or playpen to such locations presents obvious difficulties associated with their bulk and weight. Conventional carts and wagons available to carry such items usually have the single purpose of transportation and typically employ narrow wheels which easily sink into sand and soft turf. Such natural surfaces common to recreational areas also create stability problems for table-like structures having conventional legs.

SUMMARY OF THE INVENTION

Accordingly, it is an object of the present invention to provide apparatus of the general nature under discussion, but which is free of one or more of the problems which beset the relevant prior art.

It is another object to provide a vehicle for the transportation of objects to and from recreational areas, while being capable of quick, easy conversion into an exceptionally stable, multi-function table, crib or playpen.

These and other objects which will appear are achieved in accordance with the invention as follows.

The invention is a vehicle suitable for negotiating sand or soft turf, which is easily converted by the user into a stable, stationary platform. The vehicle consists of a main body whose design is tailored to one or more specific functions, and wheel assemblies pivotably attached to the body, preferably by means of a removable pivot pin. A stop prevents the axis of each wheel assembly from rotating above the horizontal plane. By lifting any side or end of the vehicle high enough off the ground so that the vehicle's weight is removed from one or more wheels, each affected wheel assembly becomes free to pivot downward under its own weight to a new, vertical position, thereby in effect becoming a leg suitable for providing a stationary support for the main body. Preferably, the pivot points are so located that the dropped wheels end up mostly beneath the body itself, thereby affording the user ready access to the full surface of the body. Wheels of sufficiently large diameter are provided so that after pivoting downward, their faces provide exceptionally stable footing for the body. After the vehicle is lifted and repositioned so that the face of each wheel rests on the ground, the resulting height of the raised body is determined by the length of the pivoted portion of the wheel assembly, including the thickness of the wheel itself. Each wheel is thick enough to permit the vehicle to function well in sand or soft turf.

A removable seat can be fitted, thereby allowing a child to be pulled or pushed when the invention is used as a vehicle. Removable solid panels can provide containment for articles. Removable screened panels and a screened top enable the vehicle to be used as a crib or playpen.

The vehicle can be fitted with tie-down cleats suitable for restraining the movement of objects during transport and useful as hand-holds while raising the vehicle in order to convert it into its stationary configuration. The cleats can also serve as a means for anchoring the vehicle in-place. Alternative hand-holds can be recessed areas formed beneath the front and rear ends of the body.

An accessible and securable storage compartment for amenities can be provided in the body. A cavity internal to the storage compartment is provided to further secure small valuables. The upper surface of the body can function as a dining surface with recessed areas to hold beverage containers. Holes in the surface offer a means for penetration of an umbrella shaft to shade the vehicle in while in its stationary configuration.

BRIEF DESCRIPTION OF THE DRAWINGS

For further details, reference is made to the description which follows, in light of the accompanying drawings, wherein.

The same reference numerals are used to designate similar elements in the several figures.

DETAILED DESCRIPTION OF THE PREFERRED EMBODIMENT

Figures 1A, 1B:
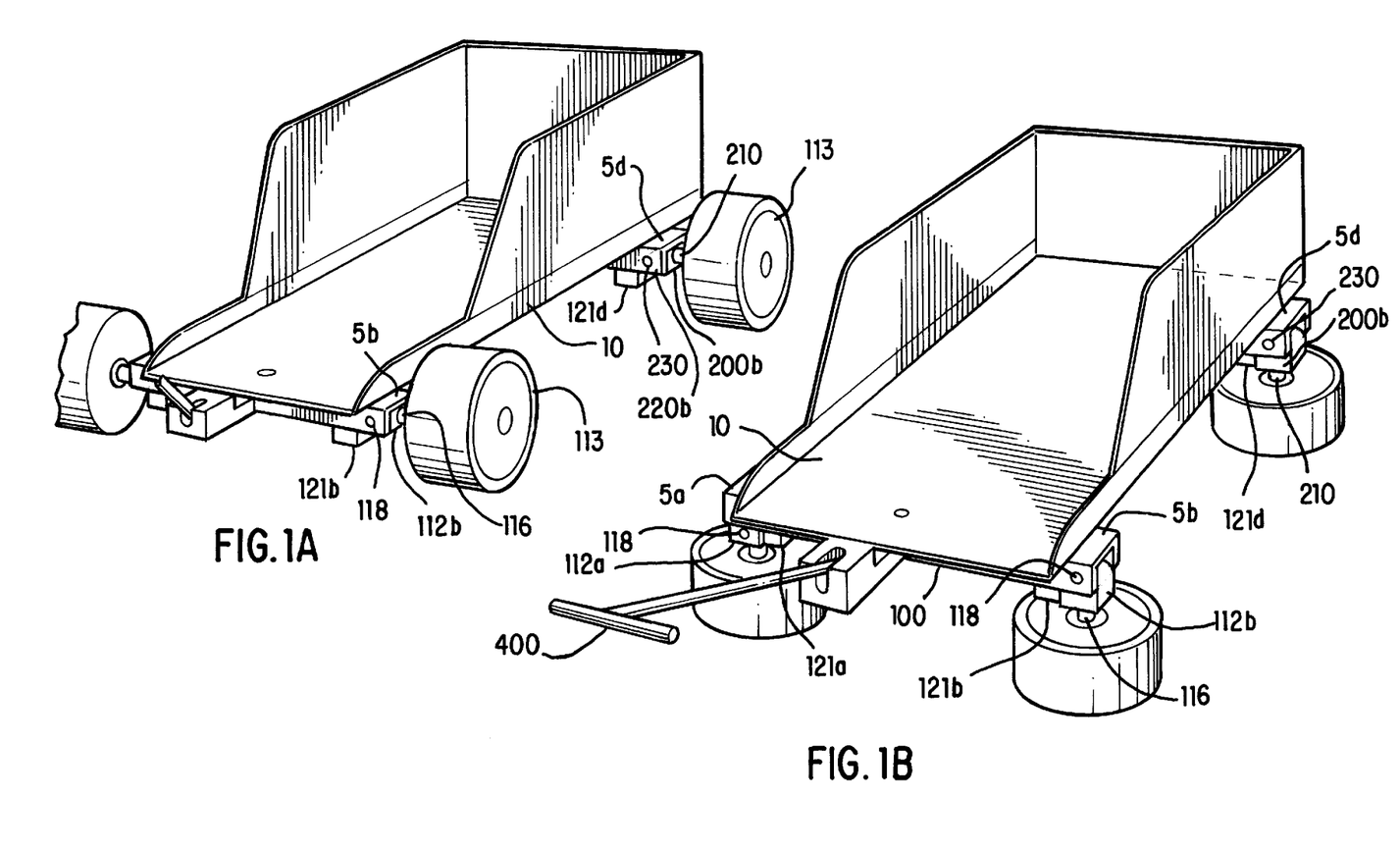
FIG. 1a is a perspective overall view of the vehicle in its wheeled configuration.
FIG. 1b is a similar view of the vehicle in its stationary configuration.
Figure 2A:
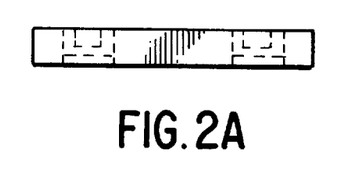
FIGS. 2a–d are detailed front, side elevation, bottom plan and top plan views, respectively, of the body.
Figure 2B:
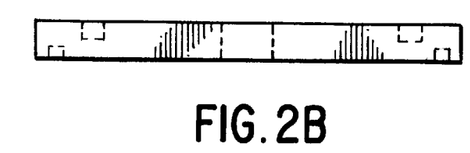
Figure 2C:
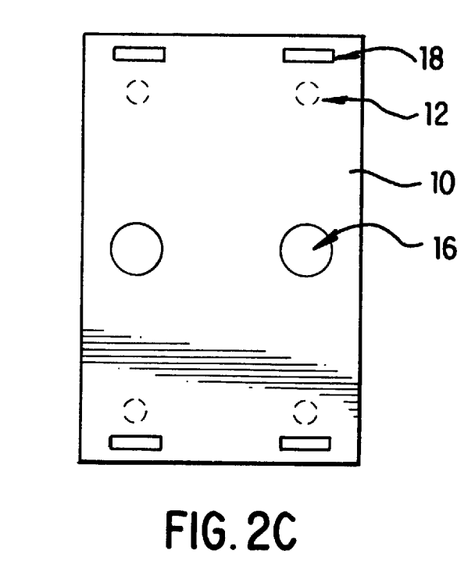
Figure 2D:
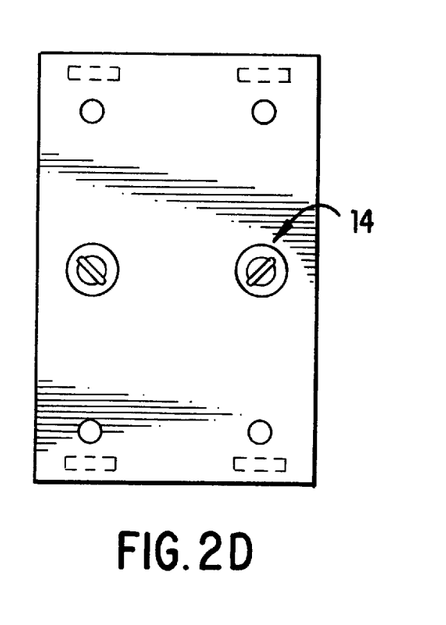

Referring to FIG. 1a, the vehicle is shown in its wheeled configuration, where the axis of each wheel assembly 112a,b,200a,b is substantially parallel to the surface on which the vehicle rests. Preferably, the vehicle is comprised of a main body 10 to which are attached front wheel assemblies 112a,b, rear wheel assemblies 200a,b and optional accessories, such as an arm for pulling 400 and yoke steering means 100. The interaction of the component parts of each wheel assembly relative to the body is described in greater detail, below.

FIG. 1b shows the vehicle after it has been converted to its stationary, multi-legged configuration. To achieve this, it is necessary to lift at least one side or end high enough to allow some, or all wheel assemblies 112a,b, 200a,b to pivot downward under the force of their own weight toward a naturally pendant, vertical position. In this position, the outer wheel-faces 113 will face the ground. The vehicle is then lowered, returning its weight to bear on the outer wheel-faces. Main body 10 thereby becomes available as a stable, stationary surface.

Turning to FIG. 2, apertures 12 in body 10 are sized to loosely contain, or in the alternative, frictionally retain popular sizes and shapes of beverage containers. Apertures 16 are sized to accommodate umbrella shafts. Threaded or "snap-fit" plugs 14 are provided for sealing apertures 16 when not in use. Grooves 18 are disposed around the perimeter of body 10 to facilitate lifting the vehicle or repositioning it between wheeled and stationary configurations.

Figure 3A:
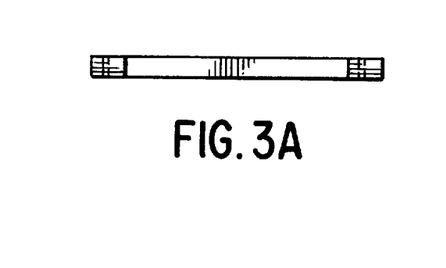
FIGS. 3a–d are detailed front, side, perspective and plan views, respectively, of the raised edge containment panel in a separately fabricated configuration.
Figure 3B:
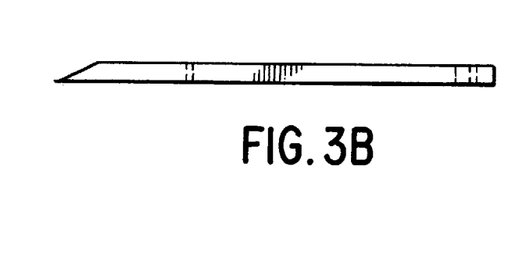
Figure 3C:
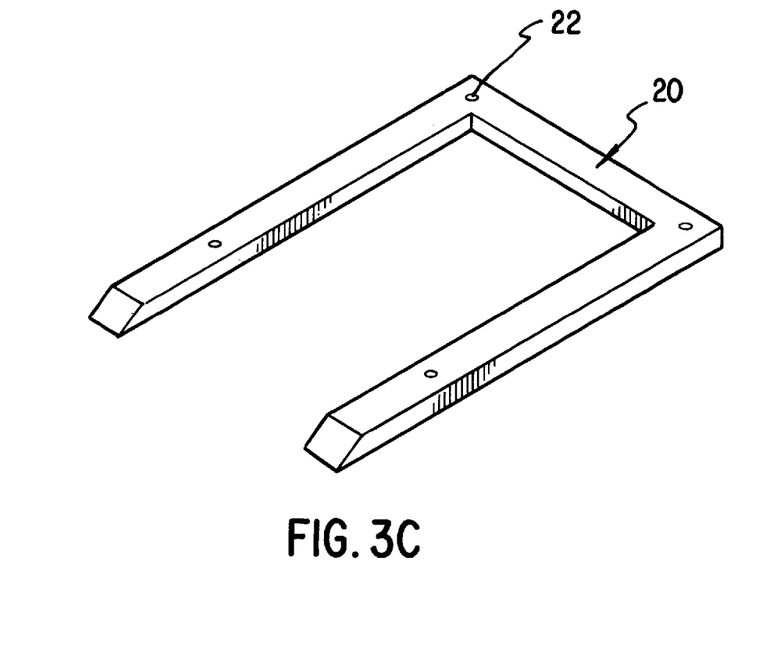
Figure 3D:
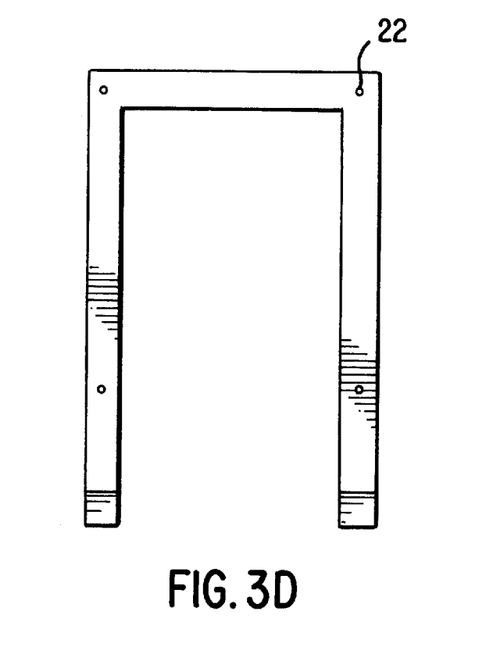
Figure 3E:
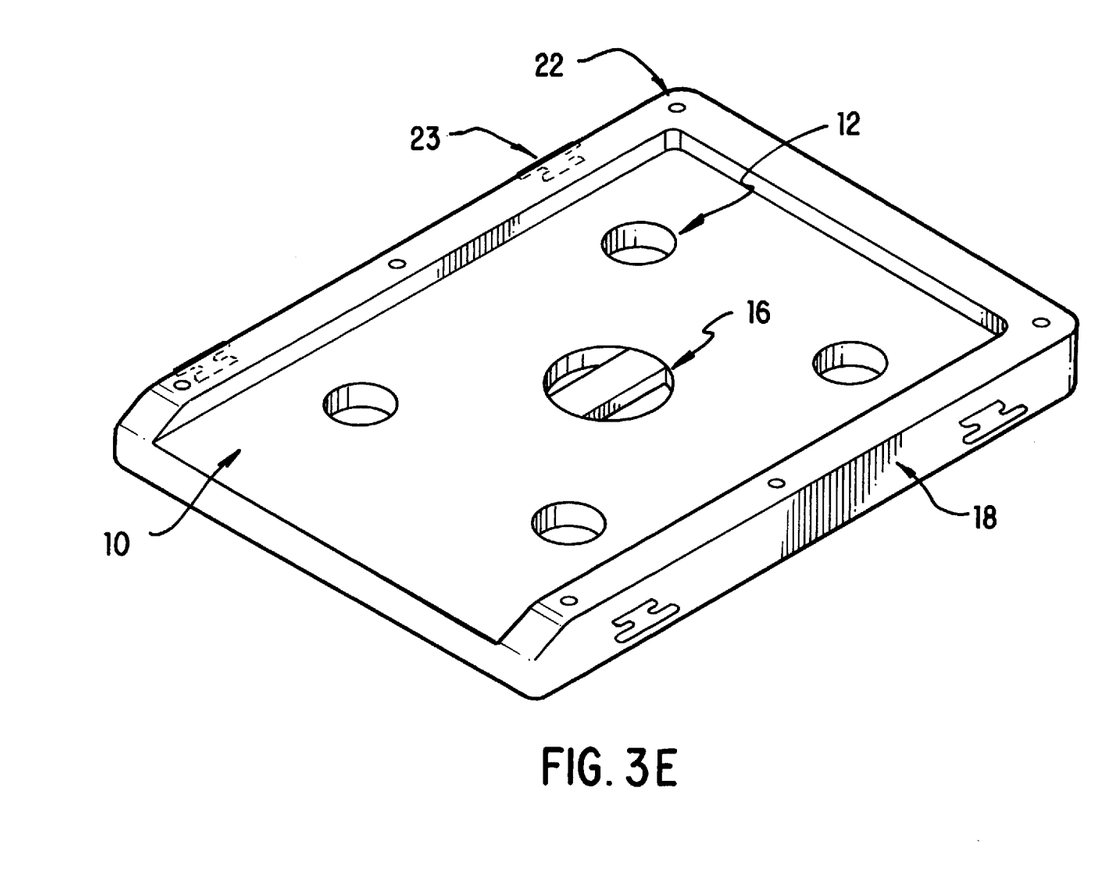
FIG. 3e shows a perspective view of the panel molded as part of the body.
Figure 4A:
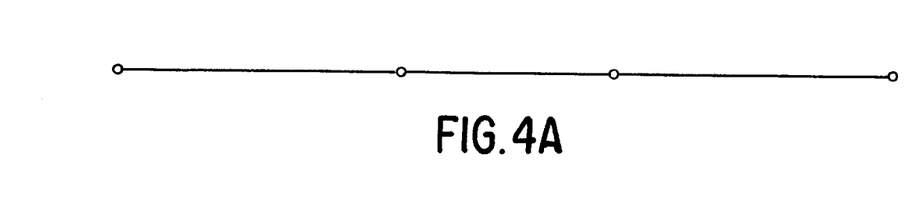
FIG. 4a–c are detailed plan, perspective and front elevation views, respectively, of removable containment panels.
Figures 4B, 4C:
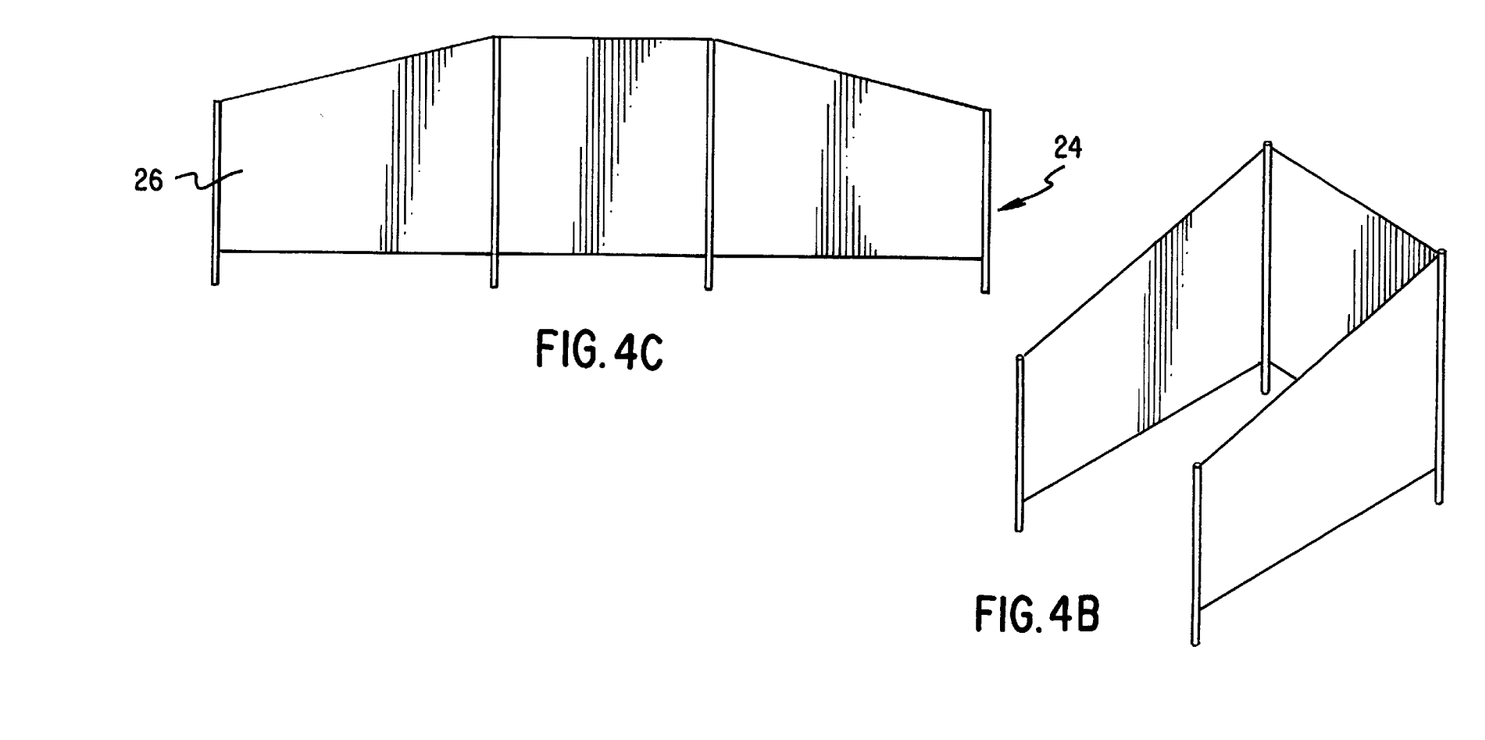
Figure 5:
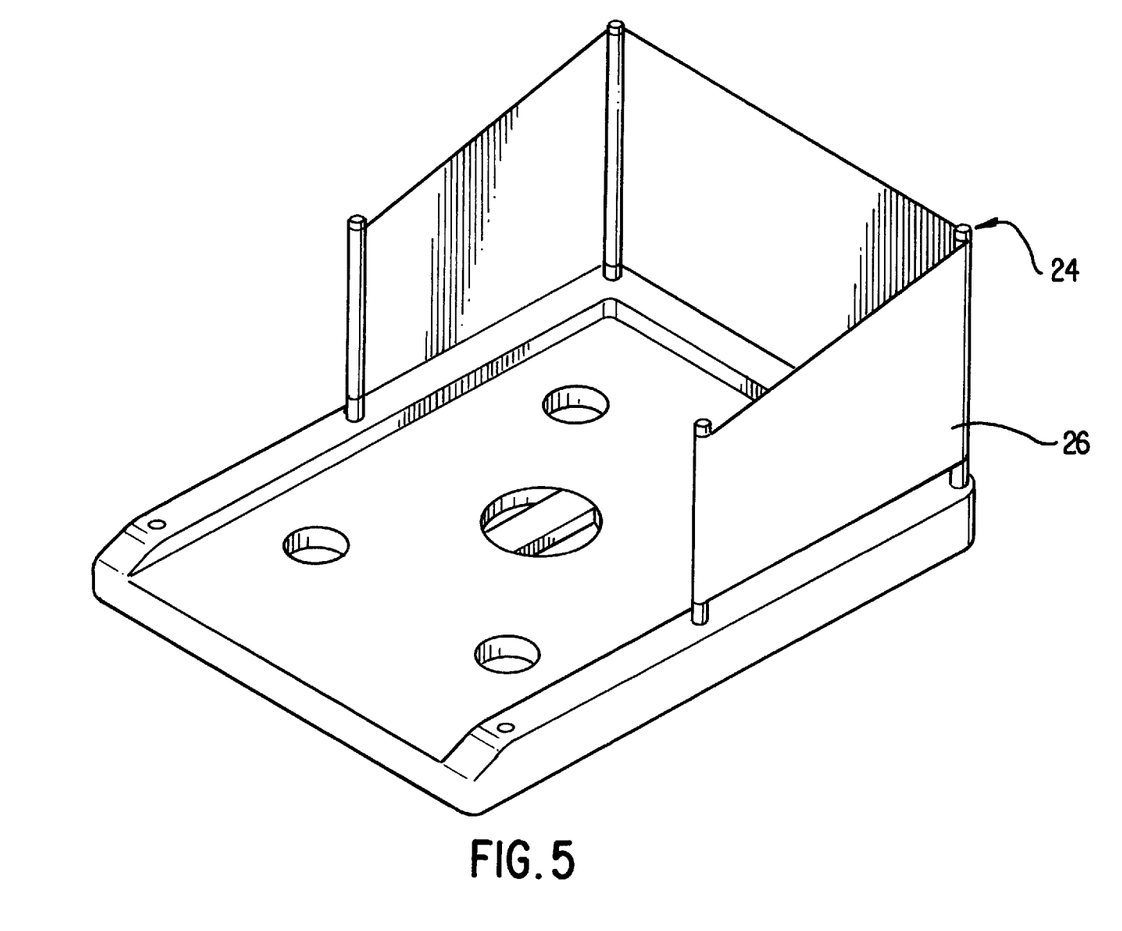
FIG. 5 is a perspective view of the body showing removable three-sided configuration of containment panels.
Figure 6:
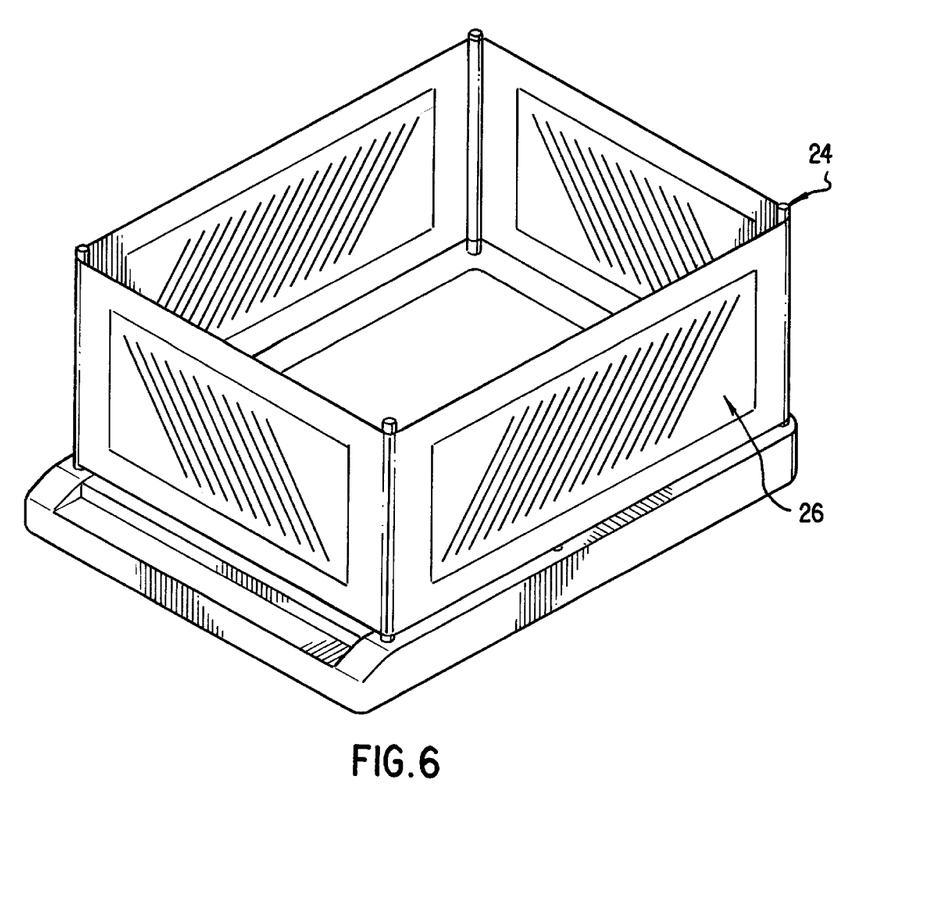
FIG. 6 is a perspective view of the body showing removable four-sided configuration of screened containment panels.
Figure 7:
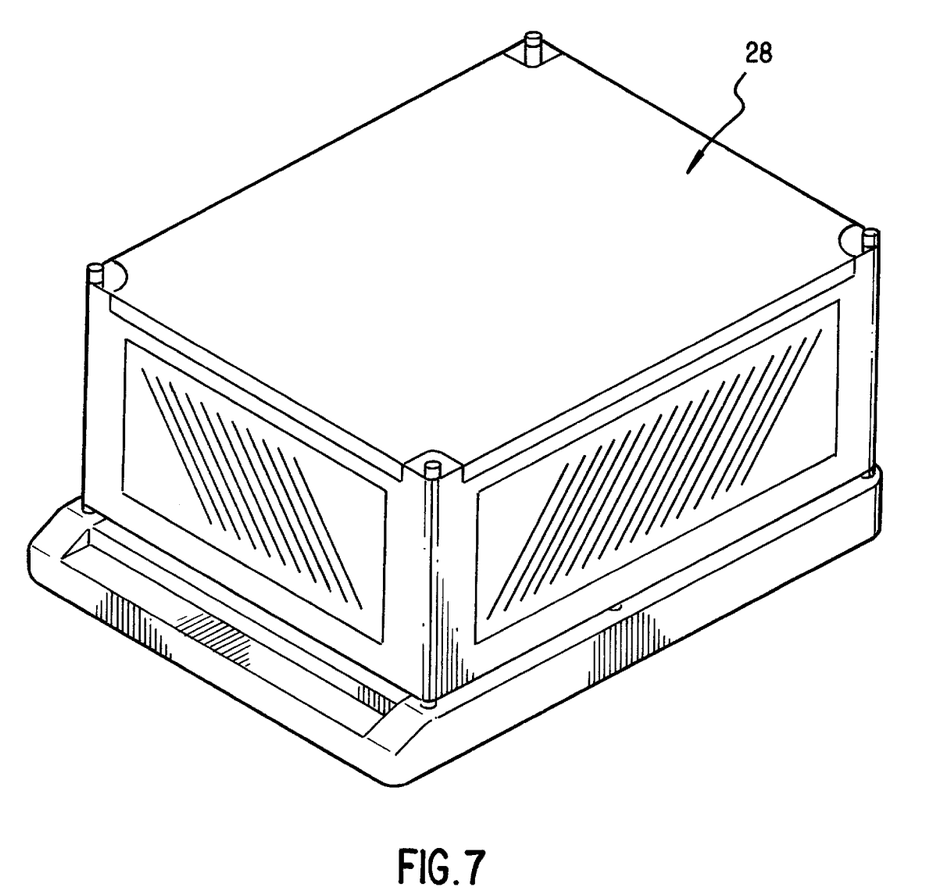
FIG. 7 is a perspective view of the body showing removable screened containment panels and removable top.

Referring to FIGS. 3a–d, raised edge containment panel 20 is shown as fabricated separately and mounted on body 10, or alternatively, molded as part of body 10 as shown in FIG. 3e. Also shown in FIG. 3e are tie-down cleats 23, positioned around the perimeter of body 10. Apertures 22 spaced around the perimeter of the raised edge containment panel 20 are provided to retain poles 24 used to mount removable containment panels 26 shown in FIG. 4. The poles and panels can be of any convenient length and height to satisfy durability and aesthetics. Panels 26 can be fabricated from flexible or rigid material. They can be disposed around body 10 in a three-sided configuration, as shown in FIG. 5 or as a four-sided configuration as shown in FIG. 6. They can be screened for ventilation and along with optional screened top-panel, they can be used as an infant shelter as shown in FIG. 7.

Figure 8:
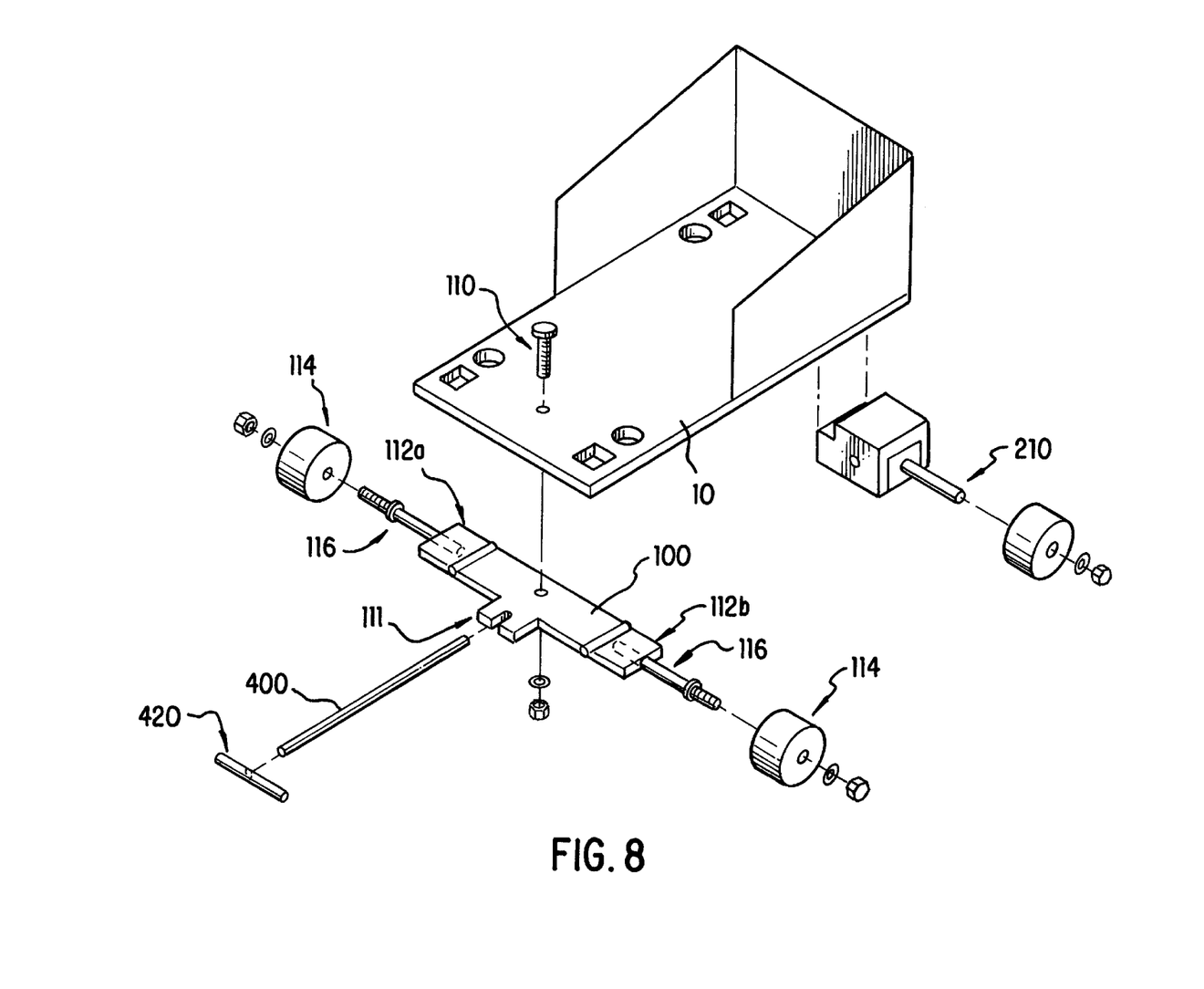
FIG. 8 is an exploded perspective view of the vehicle.

Turning to FIG. 8, steering yoke 100 is pivotably attached by bolt assembly 110 preferably to the lower surface of body 10. Right and left front wheel assemblies, 112a and 112b are each pivotably attached to steering yoke 100 at its right and left extremities, respectively, such that their pivot axis is substantially parallel to the broad plane of body 10 and substantially perpendicular to the axle of their associated wheel 114. Each front wheel 114 is mounted to its associated axle 116, and each axle is mounted to its associated wheel assembly in a manner common to the art.

Figure 9A:
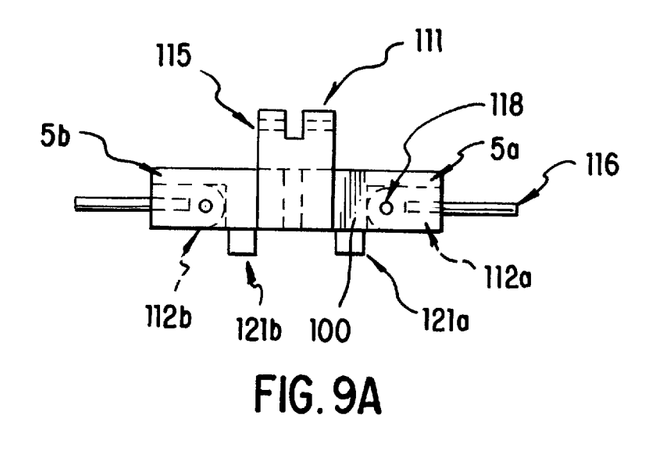
FIG. 9a–d are detailed front elevation, side, perspective and plan views, respectively, of the vehicle steering yoke.
Figure 9B:
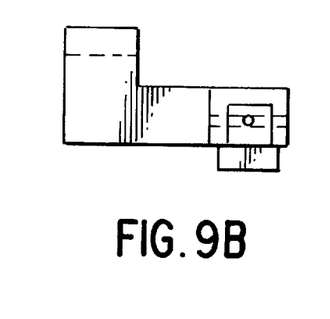
Figure 9C:
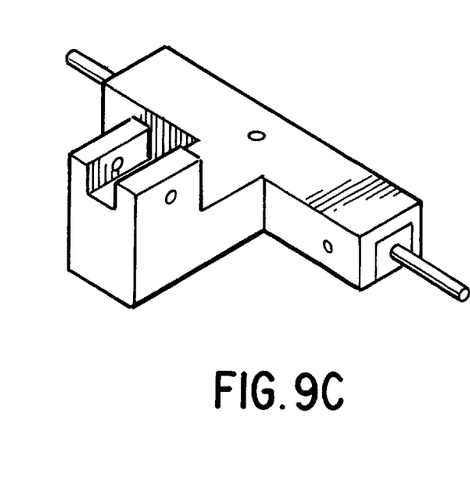
Figure 9D:
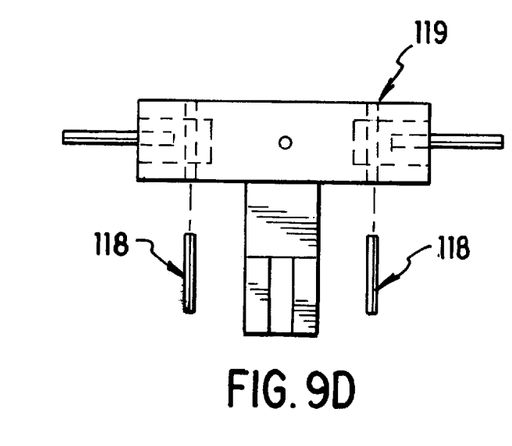

FIG. 9a, shows how wheel assemblies 112a,b are restrained from rotating above the horizontal by means of stops 5a,b, respectively, and from pivoting beyond the vertical plane by means of stops 121a,b, respectively. The stops are formed by protruding portions of the associated forked end of yoke 100. FIG. 9d shows each front wheel assembly 112a,b retained by a removable pivot pin 118 seated in yoke 100. Removal of pivot pins 118 from all wheel assemblies permits complete separation of the wheel assemblies from the body, enabling compact storage of the vehicle.

Figure 10A:
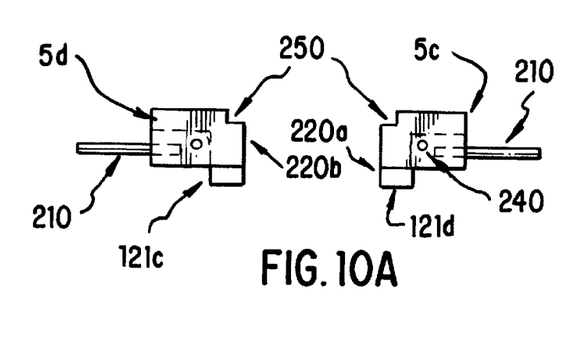
FIG. 10a–d are detailed front elevation, perspective, side elevation, and plan views, respectively, of the right and left rear wheel assemblies.
Figure 10B:
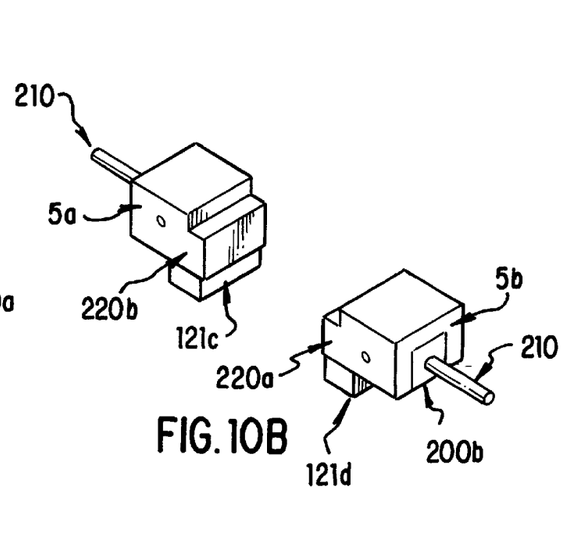
Figure 10C:
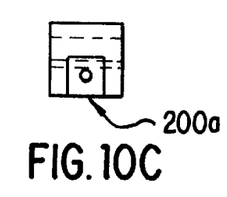
Figure 10D:
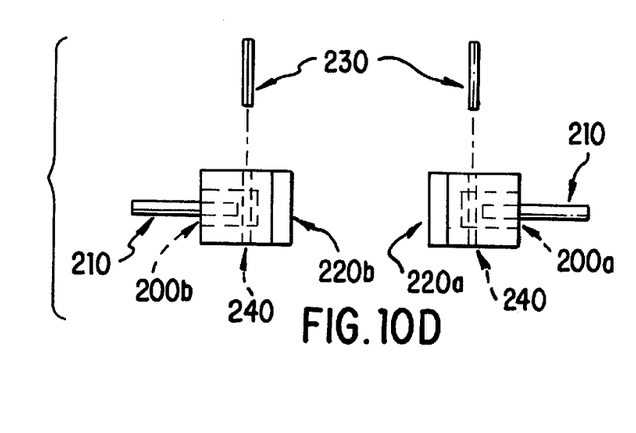

Turning to FIG. 10a, right and left rear wheel assemblies 200a,b are each pivotably attached to mounts 220a,b respectively, such that their pivot axis is substantially parallel to the broad plane of body 10 and substantially perpendicular to the axis of their associated wheel 114 (not shown in this figure). Each rear wheel 114 is mounted to its associated axle 210, and each axle is mounted to its associated wheel assembly in a manner common to the art. FIG. 10a shows how wheel assemblies 200a,b are restrained from pivoting above the horizontal by stops 5c,d, respectively and from pivoting beyond the vertical by stops 121c,d, respectively. FIG. 10d shows each rear wheel assembly 200 as pivotably retained in its associated mount 220 by removable pivot pin 230 seated in hole 240 passing therethrough.

Right and left rear mounts 220 can either be fixedly attached to, or molded as part of, body 10. FIG. 10a shows rear mounts 220a,b adapted to function as guides 250 for operatively receiving a drawer (not shown in this figure).

Figure 11A:
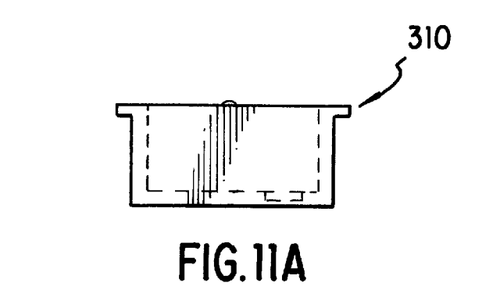
FIG. 11a–d are detailed front side elevation, perspective and plan views, respectively, of the drawer.
Figure 11B:
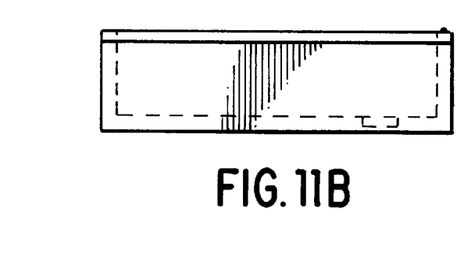
Figure 11C:
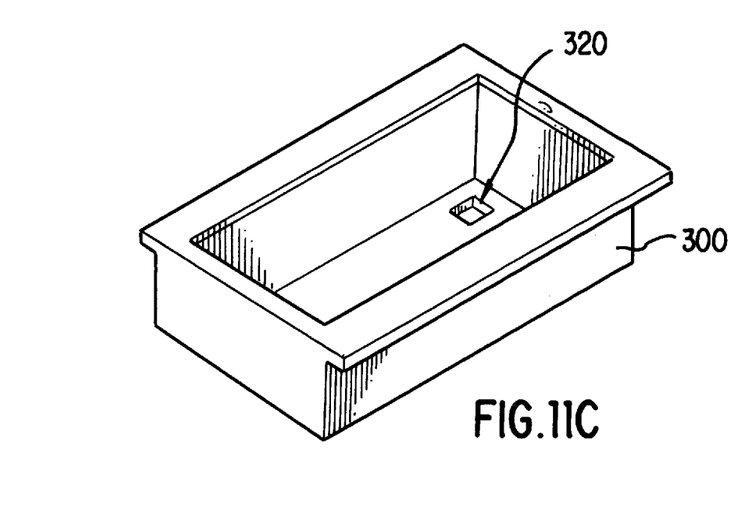
Figure 11D:
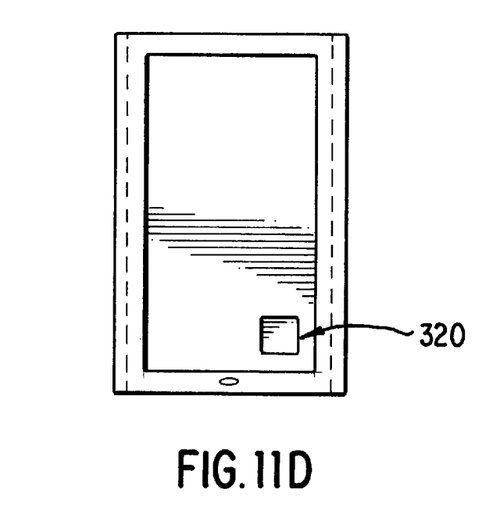
Figure 12A:
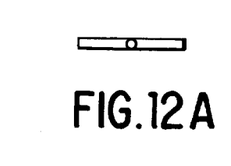
FIG. 12a–d are detailed front, side, perspective and plan views, respectively, of the telescoping handle.
Figure 12B:
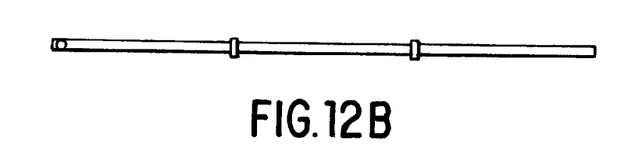
Figure 12C:
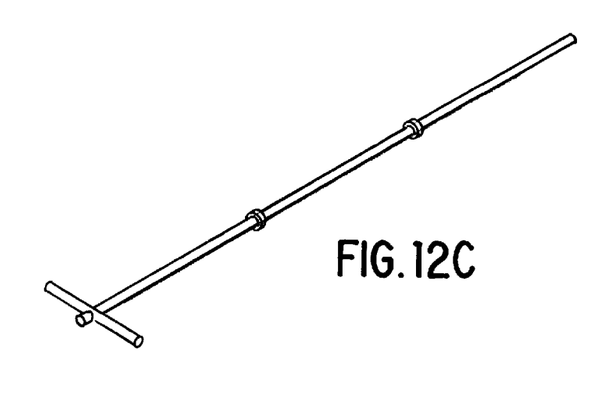
Figure 12D:
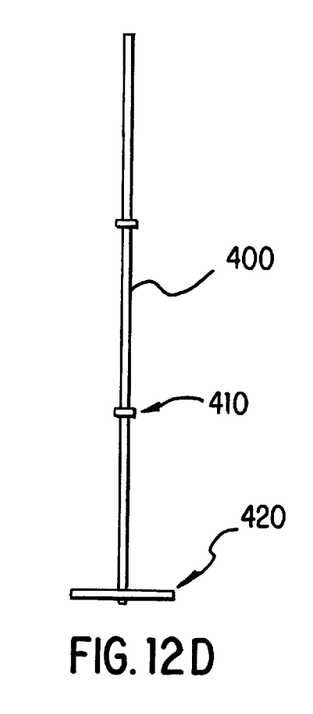

Turning to FIGS. 11a–d, drawer 300 is shown. FIG. 11a shows lip 310 on drawer 300 which cooperates with guide 250, shown in FIG. 10a. FIGS. 11-c,d show change/wallet holder 320 located in drawer 300.

And now referring to FIG. 12, a telescoping handle arm 400 is shown, showing two sets of locking nuts 410 to facilitate adjustment of arm length. Handle 420 is adapted to rotate through 360 degrees, for ergonomic reasons. Referring to FIG. 8a, mount 111 is shown wherein handle arm 400 is removably and rotatably attached to steering yoke 100 by conventional attaching means, utilizing hole 115. Mount 111 is raised above the remainder of steering yoke 100 so that mount 111 will not allow the wheels to over-steer and damage body 10. It will further facilitate rotation of the handle arm so that it will store flat against the top surface of body 10.

Although the present invention has been described with reference to the particular embodiments herein set forth, it is understood that these have been provided only by way of example and that numerous modifications will occur to those skilled in the art without departing from the spirit and scope of the invention. Thus, it is desired that the scope of the invention be limited only by the claims appended hereto.

What is claimed is:

1. Apparatus which is convertible between a multi-wheeled vehicle and a multi-legged stationary structure, comprising:
   a pair of front wheels and a pair of rear wheels;
   a main body;
   means for attaching said wheels to said body, said attaching means being constructed and arranged so that said wheels are independently reciprocable between a first position in which they support said body in the manner of a vehicle and a second position in which they support said body in the manner of a legged structure;
   said attaching means comprising means which axially support each of said wheels, each said support means being in a substantially horizontal position when said wheels are in said first position and in a substantially vertical position when said wheels are in said second position;
   means for restraining said axial support means from pivoting above said horizontal and beyond said vertical positions; and
   said attaching means further comprising a T-shaped steering yoke pivotally attached to the body at a first end, the yoke comprising:
   an axle at each of a first and a second side, supporting the pair of front wheels, and
   a forwardly extending portion at a second end, including upstanding sideways defining a longitudinally extending slot, the sidewalls pivotally supporting a steering handle therebetween.

2. The apparatus of claim 1 wherein said axial support means is attached to said body so as to be freely pivotable between said substantially horizontal and said substantially vertical position.

3. The apparatus of claim 1 wherein the weight of each wheel is sufficient to provide the force for said pivoting from horizontal to vertical positions in response to the weight of the body being lifted from the respective wheel.

4. The apparatus of claim 1 wherein said axial support means is attached to said body by a removable pivot pin.

5. The apparatus of claim 1 wherein said means for restraining said axial support means from pivoting above said horizontal and beyond said vertical positions is a stop.

6. The apparatus of claim 1 wherein said wheels are of sufficient thickness to support said cart on loose sand or soft turf.

7. The apparatus of claim 1 further comprising a telescoping handle arm removably and rotatably attached to said body.

8. The apparatus of claim 1 further comprising a drawer, said body being constructed and arranged to slidably receive said drawer.

9. The apparatus of claim 1 wherein said body is constructed and arranged to removably receive beverage containers.

10. The apparatus of claim 1 wherein said body is constructed and arranged to removably receive an umbrella pole.

11. The apparatus of claim 1 further comprising a seat, said body being constructed and arranged to removably receive said seat.

12. The apparatus of claim 1 further comprising containment panels, said body being constructed and arranged to removably receive said containment panels.

13. The apparatus of claim 1 wherein the body is constructed and arranged so as to provide hand-holds at intervals around its perimeter.

14. The apparatus of claim 1 further comprising cleats, said body being constructed and arranged to receive said cleats around its perimeter.

15. The apparatus of claims 1, wherein said means for attaching said wheels to said body is so located that the wheels in said second position are mostly beneath the body, thereby affording ready access to the body.

16. The apparatus of claim 1 wherein the wheels are of sufficiently large diameter to provide stable footing for said body when the wheels are in said second position.

17. The apparatus of claim 1 wherein said wheels are of sufficient thickness to contribute to the resulting height of said body when the wheels are in said second position.

18. The apparatus of claim 17 wherein said resulting body height is determined by the length of the wheel support means and said wheel thickness when the wheels are in said second position.

* * * * *

UNITED STATES PATENT AND TRADEMARK OFFICE
CERTIFICATE OF CORRECTION

PATENT NO. : 5,772,222
DATED : June 30, 1998
INVENTOR(S) : Richard J. Sim and George T. Zuzulock, Jr.

It is certified that error appears in the above-identified patent and that said Letters Patent is hereby corrected as shown below:

Claim 1, Column 4, line 52, the word "sideways" should be "sidewalls";

Claim 15, Column 6, line 7. the word "claims" should be "claim"

Signed and Sealed this

Sixth Day of October, 1998

Attest:

BRUCE LEHMAN

Attesting Officer

Commissioner of Patents and Trademarks